US009359928B2

(12) United States Patent
Fan et al.

(10) Patent No.: US 9,359,928 B2
(45) Date of Patent: Jun. 7, 2016

(54) AIR-ASSISTED REDUCTANT DELIVERY SYSTEM

(71) Applicant: Tenneco Automotive Operating Company Inc., Lake Forest, IL (US)

(72) Inventors: Gaofeng Fan, Shanghai (CN); Jianqiang Fan, Shanghai (CN); Yang Yang, Shanghai (CN); Mingdao Xu, Shanghai (CN); Bo Hu, Shanghai (CN); Jianzhong Guan, Shanghai (CN); Yingxin Jian, Shanghai (CN)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/380,414

(22) PCT Filed: Feb. 17, 2013

(86) PCT No.: PCT/CN2013/071619
§ 371 (c)(1),
(2) Date: Aug. 22, 2014

(87) PCT Pub. No.: WO2013/123865
PCT Pub. Date: Aug. 29, 2013

(65) Prior Publication Data
US 2015/0075136 A1 Mar. 19, 2015

(30) Foreign Application Priority Data

Feb. 23, 2012 (CN) .......................... 2012 1 0042798

(51) Int. Cl.
*F01N 3/00* (2006.01)
*F01N 3/22* (2006.01)
*F01N 3/20* (2006.01)

(52) U.S. Cl.
CPC .............. *F01N 3/227* (2013.01); *F01N 3/2066* (2013.01); *F01N 2240/16* (2013.01); *F01N 2610/02* (2013.01); *F01N 2610/08* (2013.01); *F01N 2610/1493* (2013.01); *Y02T 10/24* (2013.01)

(58) Field of Classification Search
USPC ............ 60/274, 286, 289, 295, 297, 301, 303
See application file for complete search history.

(56) References Cited

U.S. PATENT DOCUMENTS

| 5,522,218 | A | * | 6/1996 | Lane | ................... | B01D 53/9495 |
| | | | | | | 60/274 |
| 5,884,475 | A | * | 3/1999 | Hofmann | ........... | B01D 53/9431 |
| | | | | | | 60/274 |

(Continued)

FOREIGN PATENT DOCUMENTS

| CN | 1738970 A | 2/2006 |
| CN | 102251832 A | 11/2011 |

(Continued)

*Primary Examiner* — Binh Q Tran
(74) *Attorney, Agent, or Firm* — Harness, Dickey & Pierce, P.L.C.

(57) ABSTRACT

A pump assembly (214) for an exhaust treatment system is provided that may include a housing (220), a gas flow path (259), a reductant flow path (239) and a pump (224). The housing may include a first inlet (236) configured to receive a reductant from a tank (210), a second inlet (252) configured to receive a gas from a gas compressor (13), and an outlet (262) through which the gas and the reductant exit the housing. The gas flow path may extend between and fluidly communicate with the second inlet and the outlet. The reductant flow path may extend between and fluidly communicate with the first inlet and the outlet. The pump may be at least partially disposed within the housing and may include a motor in a heat transfer relationship with gas flowing through the gas flow path.

42 Claims, 9 Drawing Sheets

(56) References Cited

U.S. PATENT DOCUMENTS

| | | |
|---|---|---|
| 6,273,120 B1 | 8/2001 | Hofmann et al. |
| 7,458,204 B2 | 12/2008 | Plougmann |
| 7,571,599 B2 | 8/2009 | Hirata |
| 7,703,276 B2 | 4/2010 | Ueno |
| 7,937,934 B2 | 5/2011 | Plougmann |
| 8,029,249 B2 | 10/2011 | Jochumsen et al. |
| 8,132,405 B2 * | 3/2012 | Katou ................ B01D 53/9409 60/295 |
| 8,359,831 B2 * | 1/2013 | Chmielewski ........ F01N 3/2066 60/286 |
| 8,359,833 B2 * | 1/2013 | Nalla ...................... F01N 3/103 60/274 |
| 8,459,012 B2 | 6/2013 | Sun et al. |
| 8,646,475 B2 * | 2/2014 | Jochumsen ........... F01N 3/2066 137/114 |
| 8,671,664 B2 | 3/2014 | Garcia et al. |
| 8,789,362 B2 | 7/2014 | Overhoff et al. |
| 9,032,710 B2 | 5/2015 | White et al. |
| 2004/0101450 A1 | 5/2004 | Mayer |
| 2005/0284136 A1 | 12/2005 | Plougmann |
| 2012/0181261 A1 | 7/2012 | Bruck et al. |
| 2012/0311999 A1 | 12/2012 | Hodgson et al. |

FOREIGN PATENT DOCUMENTS

| | | |
|---|---|---|
| WO | WO-2008-048147 A1 | 4/2008 |
| WO | WO-2011-029774 A1 | 3/2011 |

* cited by examiner

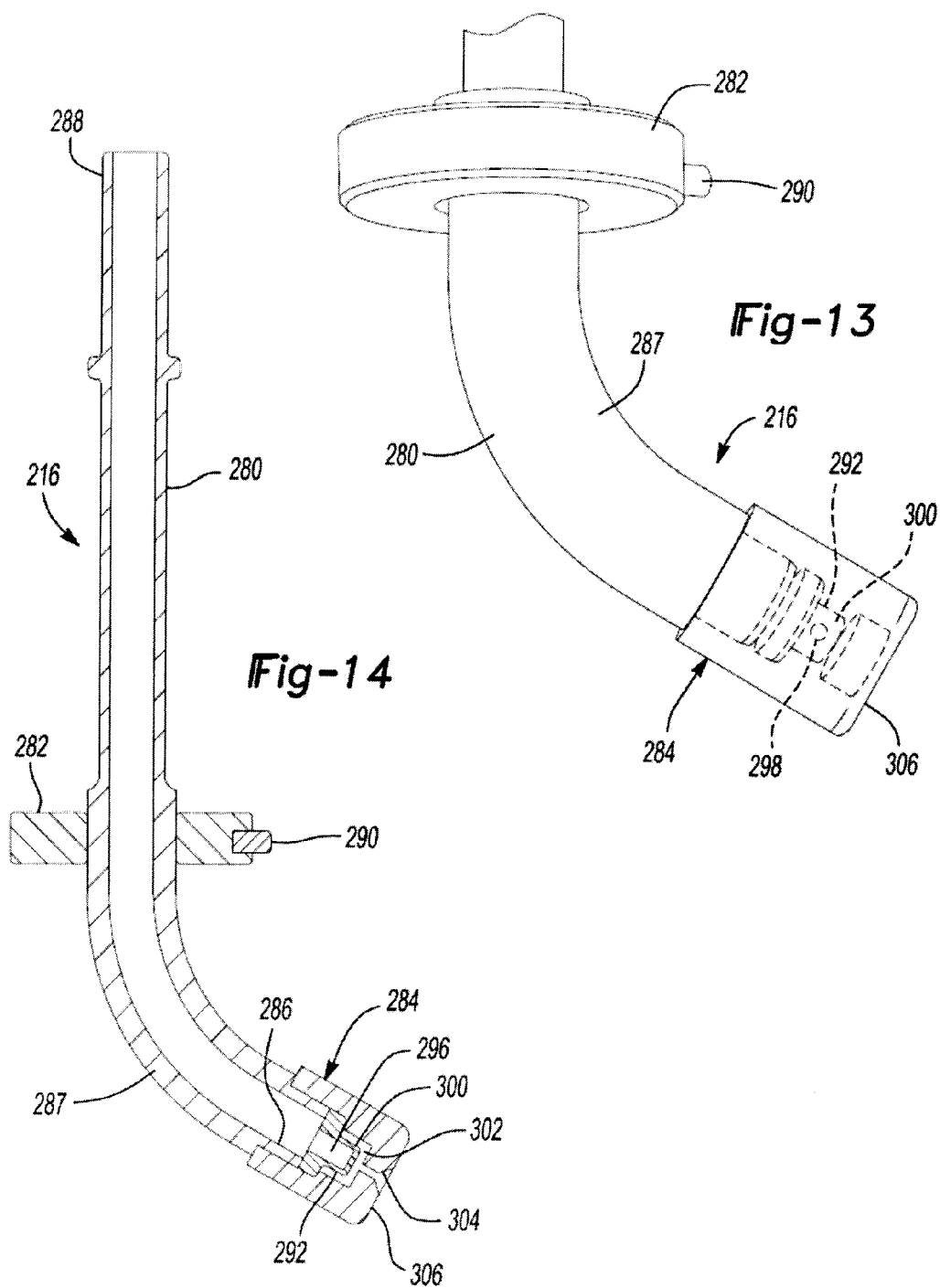

AIR-ASSISTED REDUCTANT DELIVERY SYSTEM

CROSS REFERENCE

This application claims the benefit of CN Application No. 201210042798.7, filed on Feb. 23, 2012. The disclosure of the above application is incorporated herein by reference.

FIELD

The present disclosure relates to an exhaust treatment system. More particularly, an air-assisted reductant delivery system is provided.

BACKGROUND

This section provides background information related to the present disclosure and is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems are constructed using urea-based technology including a container for storing the urea and a delivery system for transmitting the urea from the container to the exhaust stream. While these systems may have performed well in the past, it may be desirable to provide an air-assisted delivery system to more efficiently and effectively deliver the urea (or other reductant) to the exhaust stream.

SUMMARY

This section provides a general summary of the disclosure, and is not a comprehensive disclosure of its full scope or all of its features.

In one form, the present disclosure provides a pump assembly for an exhaust treatment system that may include a housing, a gas flow path, a reductant flow path and a pump. The housing may include a first inlet configured to receive a reductant from a tank, a second inlet configured to receive a gas from a gas compressor, and an outlet through which the gas and the reductant exit the housing. The gas flow path may extend between and fluidly communicate with the second inlet and the outlet. The reductant flow path may extend between and fluidly communicate with the first inlet and the outlet. The pump may be at least partially disposed within the housing and may include a motor in a heat transfer relationship with gas flowing through the gas flow path.

In another form, the present disclosure provides a pump assembly for an exhaust treatment system that may include a housing, a gas flow path, a reductant flow path and a mixing device. The housing may include a first inlet configured to receive a reductant from a tank, a second inlet configured to receive a gas from a gas compressor, and an outlet through which the gas and the reductant exit the housing. The gas flow path may extend between and fluidly communicate with the second inlet and the outlet. The reductant flow path may extend between and fluidly communicate with the first inlet and the outlet. The mixing device may be at least partially disposed within the housing and may include a mixing chamber receiving gas from the gas flow path and reductant from the reductant flow path. The mixing device may include a gas inlet and a valve disposed between the gas inlet and the mixing chamber. The valve may allow fluid to flow from the gas inlet to the mixing chamber and may restrict fluid flow from the mixing chamber to the gas inlet.

In another form, the present disclosure provides an exhaust treatment system that may include a gas flow path, a reductant flow path, a nozzle, and a purge line. The gas flow path may include a valve. The reductant flow path may include a pump operable to draw reductant from a storage container through the reductant flow path. The nozzle may receive the gas downstream of the valve and may receive reductant from the pump. The purge line may include a first portion fluidly connected to the gas flow path upstream of the valve, and a second portion fluidly connected to the reductant flow path. The purge line may include a purge valve selectively allowing gas from the gas flow path to flow into the purge line and into the reductant flow path.

In another form, the present disclosure provides a method of operating a reductant delivery system. The reductant delivery system may include a reductant flow path, an air flow path, and a nozzle in selective fluid communication with the reductant flow path and the air flow path. The method may include operating the system in a first mode in which reductant is prevented from flowing through the nozzle and air is allowed to flow through the air flow path and the nozzle. The method may also include operating the system in a second mode in which a supply of air is restricted from the air flow path and reductant is allowed to at least partially fill the reductant flow path and a pathway between the reductant flow path and the nozzle. The method may also include operating the system in a third mode in which air is allowed to flow through the air flow path and the nozzle and reductant is simultaneously allowed to flow through the reductant flow path and the nozzle. The method may also include operating the system in a fourth mode in which air is allowed to flow through the air flow path and the nozzle and purge reductant from the pathway between the reductant flow path and the nozzle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 13 is a partial perspective view of an injector according to the principles of the present disclosure; and FIG. 14 is a cross-sectional view of the injector of FIG. 13.

Corresponding reference numerals indicate corresponding parts throughout the several views of the drawings.

DETAILED DESCRIPTION

Figure 1:
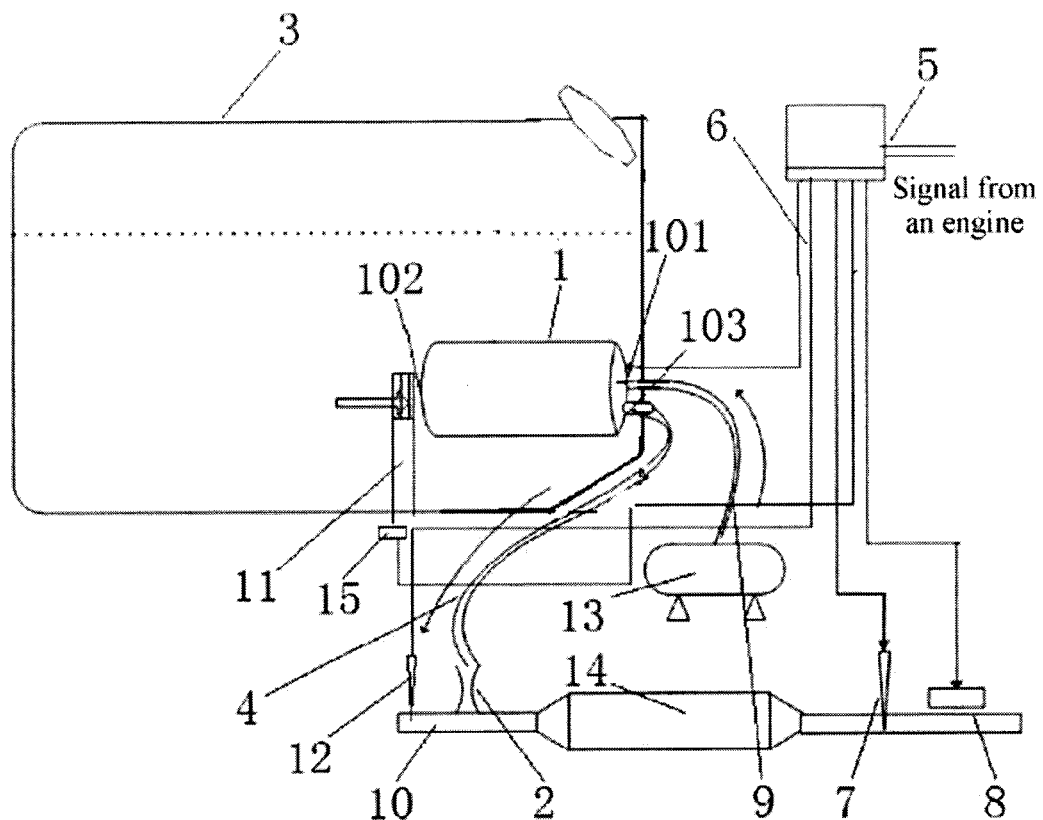
FIG. 1 is a schematic structural view of an air-assisted reducing agent metering and ejecting system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an air-assisted reductant delivery system is provided and may include a reducing agent storage tank 3 for storing a reducing agent, a heating device 11 disposed in the reducing agent storage tank and heating the reducing agent, a compressed air generation device 13 for conveying or providing compressed air, a metering component 1 (e.g., a pump assembly) disposed in the reducing agent storage tank 3, an exhaust gas emission device 10, an ejection nozzle 2, and a control device 5. The compressed air generation device 13 may be an air compressor or an air storage tank for storing the compressed air.

The reducing agent storage tank 3 may generally store a reducing agent such as urea solution, diesel oil, or alcohol. In the heating device 11, for example, PTC or resistance heating wire may be adopted to heat the reducing agent, or heat of cooling water of an engine may also be used for heating, which are heating manners adopted in the prior art and will not be described in detail here again. The heating device 11 is generally disposed near a reducing agent inlet (described below) of the metering component 1, so as to effectively heat a reducing agent entering the metering component 1. The ejection nozzle 2 is disposed on the exhaust gas emission device 10, one end of the ejection nozzle 2 is connected to an outlet (described below) for mixed compressed air and reducing agent through a mixed liquid conveying pipeline 4, receives the mixed compressed air and reducing agent, atomizes the received mixed compressed air and reducing agent, and then ejects the atomized mixed compressed air and reducing agent into exhaust gas of the exhaust gas emission device 10.

The metering component 1 may be fixed at the bottom, a side or the top of the reducing agent storage tank 3 (described below).

The control device 5 may accept various signals from the engine. Meanwhile, the control device 5 is connected to a front exhaust gas temperature sensor 12, a rear exhaust gas temperature sensor 7 of an after-treatment reactor 14 disposed on the exhaust gas emission device 10, a nitrogen oxide sensor 8, and a reducing agent temperature sensor (not shown) of the metering component 1 through a control wire bundle 6, and receives signals from the sensors. Meanwhile, the control device 5 is connected to the heating device 11, a reducing agent conveying device (e.g., a pump) of the metering component 1, and a metering device (described below). The control deice 5 controls work of the heating device 11, the reducing agent conveying device of the metering component 1, and the metering device. The reducing agent temperature sensor of the metering component 1 may be disposed at a surface of a pipeline through which reducing agent solution flows or near the surface. It is judged whether the reducing agent in the reducing agent storage tank 3 needs to be heated by receiving the signal from the engine and the signal from the reducing agent temperature sensor of the metering component 1. If the reducing agent in the reducing agent storage tank 3 needs to be heated, a control part 15 of the control device 5 is started to heat the reducing agent storage tank 3, to heat the frozen reducing agent in the reducing agent storage tank 3 into a liquid reducing agent. The control device 5 sends a signal to the metering component 1 to start the reducing agent conveying device and the metering device 9 (described below) to work, and meanwhile, a valve of the compressed air generation device 13 is opened. In this way, compressed air passes through a pipeline 9 to mix with an accurately metered reducing agent, and then the mixture is conveyed to the ejection nozzle 2 disposed on the exhaust gas emission device 10 through the mixed liquid conveying pipeline 4. The mixed reducing agent solution is atomized by the ejection nozzle 2, then is ejected into the exhaust gas emission device 10, and undergoes chemical reaction with exhaust gas of the engine in the after-treatment reactor 14 disposed on the exhaust gas emission device 10, so as to achieve the purpose of reducing the harmful component in the exhaust gas.

Figure 2:
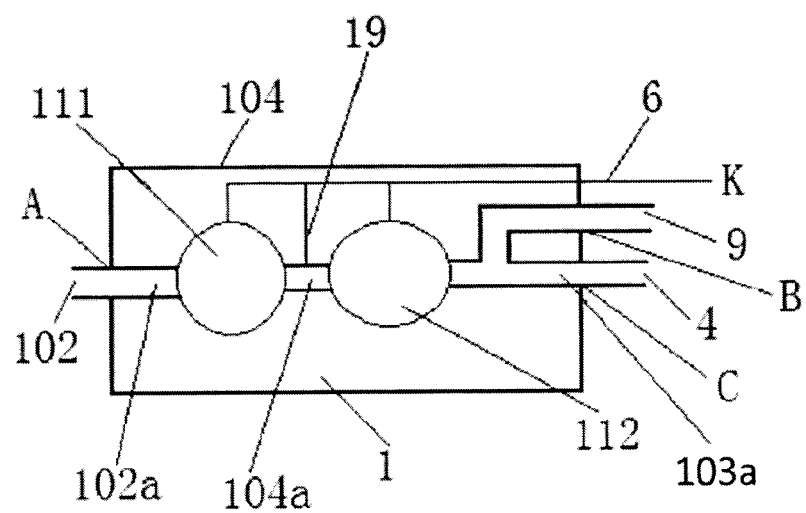
FIG. 2 is a schematic structural view of a metering component of the air-assisted reducing agent metering and ejecting system of FIG. 1.

Referring to FIG. 2, the metering component 1 includes a sealed shell 104, a reducing agent conveying device 111 disposed in the shell, an inlet pipeline 102*a* for receiving the reducing agent from the reducing agent storage tank 3 and inputting the reducing agent into the reducing agent conveying device 111, a discharge pipeline 103*a* for discharging the reducing agent from the metering device, and a metering device 112 disposed in the shell 104 and metering the reducing agent from the reducing agent conveying device. The pipeline 9 for discharging the compressed air from the compressed air generation device 13 communicates with the discharge pipeline 103*a* at the metering component 1. The discharge pipeline 103*a* communicates with the mixed liquid conveying pipeline 4. In this way, the mixed compressed air and reducing agent discharged from the discharge pipeline 103*a* enter the mixed liquid conveying pipeline 4. The reducing agent conveying device 111 is connected to the metering device 112 through a pipeline 104*a*. The inlet pipeline 102*a* communicates with the reducing agent storage tank 3 through a reducing agent inlet 102. The reducing agent of the reducing agent storage tank 3 enters the compressed air generation device 13 from the reducing agent inlet 102 through the inlet pipeline 102*a*, undergoes power conveying of the reducing agent conveying device 111, and then is conveyed to the metering device 112 through the pipeline 104*a*. The compressed air of the compressed air generation device 13 enters the pipeline 103*a* through the pipeline 9. A communicating part between the pipeline 9 and the discharge pipeline 103*a* is located inside the shell 104. Meanwhile, the reducing agent discharged from the metering device 10 112 also enters the discharge pipeline 103*a*. In this way, the compressed air entering the discharge pipeline 103*a* and the reducing agent entering the discharge pipeline 103*a* are mixed and enter the mixed liquid conveying pipeline 4. The reducing agent conveying device 111 may be various pumps, for example, a centrifugal pump or a gear pump. Just like the prior art, the metering device 112 may be a metering valve or metering pump.

In a first embodiment of the metering component 1 shown in FIG. 2, the sealed shell 104 is a sealed shell, and the reducing agent conveying device 111, the metering device 112, a part of the pipeline 9, a part of the reducing agent inlet pipeline 102*a*, a part of the discharge pipeline 103*a*, and all of the pipeline 104*a* are mounted in the shell 104. In this way, seal devices, for example, seal rings or seal gum, are disposed at location A where the pipeline 102*a* and the shell 104 are connected, location B where the pipeline 9 and the shell 104 are connected, and location C where the pipeline 103*a* and the shell 104 are connected, so as to prevent the reducing agent of the reducing agent storage tank 3 from permeating into the shell 104. In this way, the reducing agent conveying device 111, the metering device 112, and the pipelines included in the shell 104 are completely sealed in the shell 104. Even if the metering component 1 is immersed in the reducing agent of the reducing agent storage tank 3, the metering component 1 is not affected by the reducing agent liquid. If the reducing agent is corrosive, a surface of the sealed shell 104 may be coated with an anticorrosion coating or an anticorrosion cover is added. Definitely, an anticorrosion material, for example, stainless steel, may also be selected to make the shell 104. A temperature sensor 19 is disposed on an outer surface of the pipeline 104*a* and used to measure a temperature of a reducing agent flowing through the pipeline. The temperature sensor 19 is connected to the control device 5 at the end K through a piece of control wire of the control wire bundle 6, and meanwhile, the control wire is also connected to the reducing agent conveying device 111 and the metering device 112 so that the control device 5 can control work, for example, turn-on and turn-off, of the reducing agent conveying device 111 and the metering device 112. Definitely, the temperature sensor 19 may also be disposed on other pipelines, for example, the pipeline 102*a* or 103*a*, or even may be disposed in the reducing agent storage tank 3. It can be seen from the foregoing 11 description that, in this embodiment, the reducing agent flowing through the reducing agent conveying device 111 and the metering device 112 and the reducing agent unmixed with the compressed air are both located in the shell 104, so as to ensure that temperatures of the two reducing agents are close to a temperature of the reducing agent in the reducing agent storage tank 3 and that the two reducing agents can be heated by the heating device 11. Definitely, it can be known by persons skilled in the art that, if the pipelines 102*a* and 103*a* and the pipeline 9 are tightly fit with the shell 104 and sealed, the seal device may also be omitted.

Furthermore, the reducing agent conveying device 111 and the metering device 112 may be integrated together or are replaced with a device, for example, a metering pump, with a fluid conveying function and a metering function.

Figure 3:
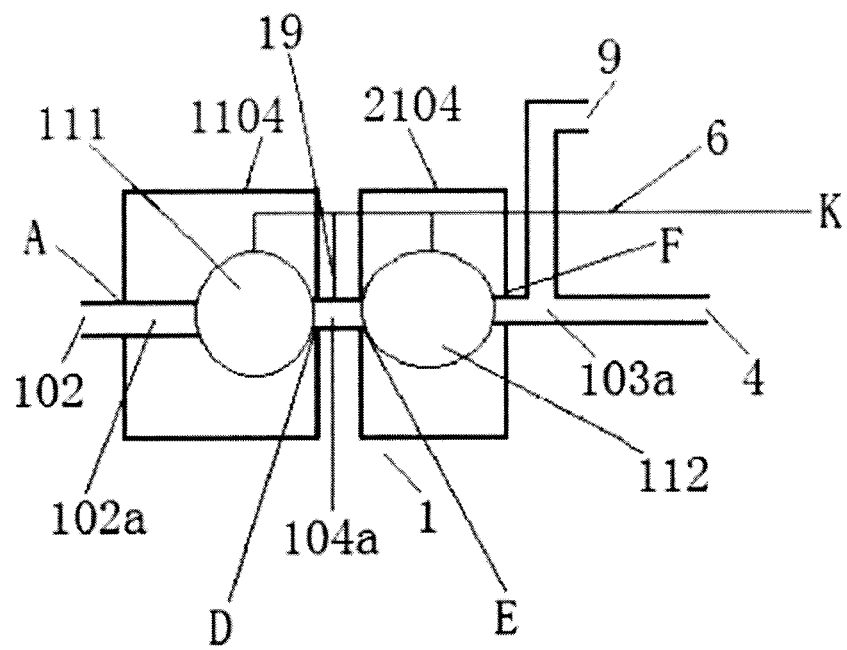
FIG. 3 is a schematic structural view of another metering component according to the principles of the present disclosure.

It can be seen from FIG. 2 that, the sealed shell 104 is mainly used to seal the reducing agent conveying device 111, the metering device 112, and the pipelines inside the shell 104 for transmitting the reducing agent, so that the reducing agent conveying device 111, the metering device 112, and the pipelines can be placed in the reducing agent storage tank 3. Referring to FIG. 3, a second embodiment of the metering component 1 is shown. The difference between this embodiment and the embodiment in FIG. 2 is that, the sealed shell 104 in FIG. 3 is actually formed by a shell 1104 of the reducing agent conveying device 111, a shell 2104 of the metering device 112, a shell of the pipeline 104*a*, and seals (not shown) at joint D between the pipeline 104*a* and the shell 1104 and joint E between the pipeline 104*a* and the shell

2104. If the reducing agent is corrosive and the shell of the pipeline 104*a* has no anticorrosion ability, an anticorrosion coating may be added on an outer surface of the pipeline 104*a*. Like the first embodiment in FIG. 2, seal devices, for example, seal rings or seal gum, are disposed at joint A between the pipeline 102*a* and the shell 1104 and joint F between the pipeline 103*a* and the shell 2104. However, in this embodiment, a communicating part between the pipeline 9 and the pipeline 103*a* is located outside the shell 2104 but is close to the shell 2104. In fact, the present invention just enables the communicating part to be close to the shell 2104 randomly. In this way, It can still be 12 ensured that a temperature of the reducing agent solution flowing out of the metering device 112 and unmixed with the compressed air of the outflow pipeline 9 is still very close to the temperature of the reducing agent of the reducing agent storage tank 3, so the objective of the present invention can also be achieved. A distance from the communicating part to the shell 2104 may be easily set according to a specific structure by persons skilled in the art, and may generally be 1 cm to 5 cm, so as to ensure that the temperature of the reducing agent solution flowing out of the metering device 112 and unmixed with the compressed air of the outflow pipeline 9 is still high and is close to the temperature of the reducing agent in the reducing agent storage tank 3, and therefore the reducing agent solution is not condensed.

Figure 4:
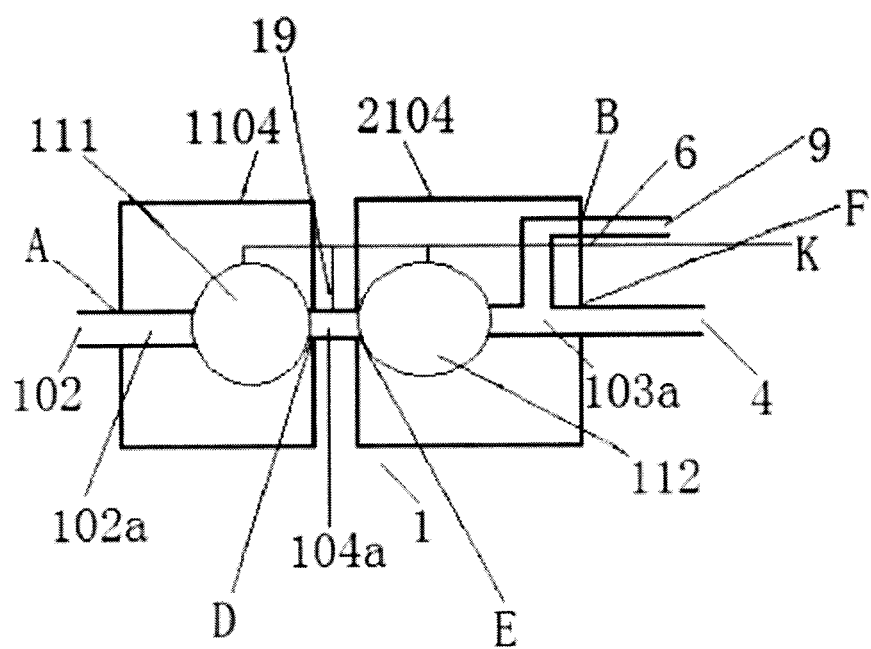
FIG. 4 is a schematic structural view of another metering component according to the principles of the present disclosure.

Referring to FIG. 4, a third embodiment of the metering component 1 is shown. A difference between this embodiment and the second embodiment in FIG. 3 is that, the communicating part between the pipeline 9 and the pipeline 103*a* is located inside the shell 2104. In this way, like the second embodiment in FIG. 3, the reducing agent flowing through the reducing agent conveying device 111 and the metering device 112 and the reducing agent unmixed with the compressed air are both located in the shell 1104 or 2104, so as to ensure that the two reducing agents may also be heated by the heating device 11.

Figure 5:
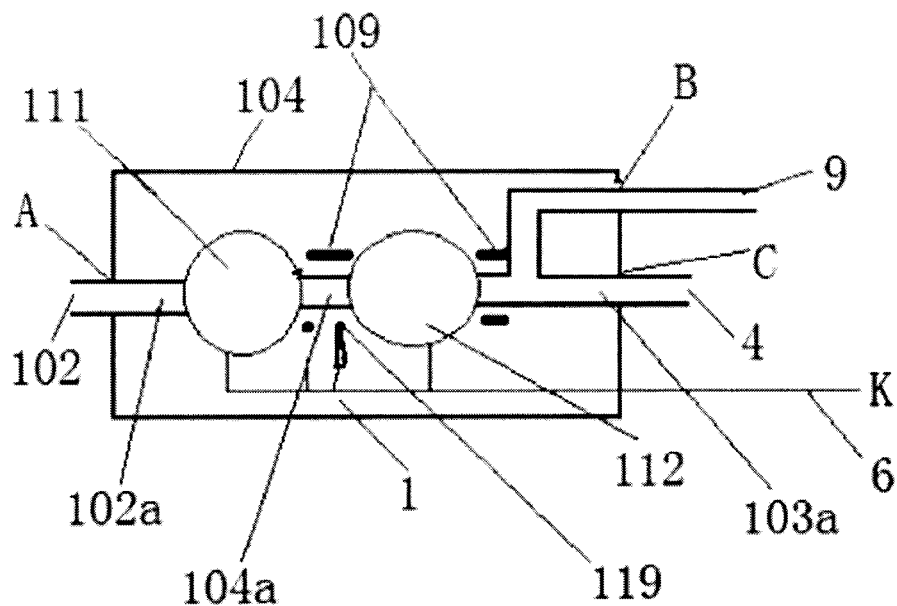
FIG. 5 is a schematic structural view of another metering component according to the principles of the present disclosure.

Referring to FIG. 5, a fourth embodiment of the metering component 1 is shown. A difference between this embodiment and the embodiment in FIG. 2 is that, a heating device 109 is further disposed in the sealed shell 104, so as to further heat the reducing agent flowing out of the metering device 112 and unmixed with the compressed air of the outflow pipeline 9. It should be noted that, as described above, if the heating device 109 does not exist, the air-assisted reducing agent metering and ejecting system of the present invention can also achieve the objective of the present invention. However, the heating device 109 is disposed to further prevent the reducing agent in the metering component 1 from being condensed at an extreme temperature.

Figure 6:
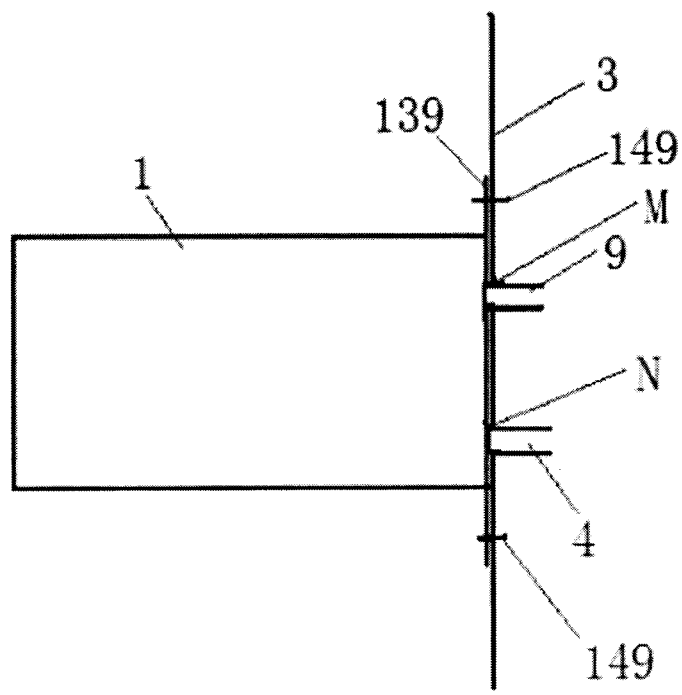
FIG. 6 is a schematic view of a fixing and connecting manner of the metering component and a reducing agent storage tank of the air-assisted reducing agent metering and ejecting system.

FIG. 6 is a schematic view of an embodiment of a fixing and connecting manner of the 13 metering component 1 and the reducing agent storage tank 3 of the air-assisted reducing agent metering and ejecting system of the present invention. Referring to FIG. 6, the metering component 1 is fixed at a side of the reducing agent storage tank 3, generally at a side near the compressed air generation device 13, through a flange 139 by using a screw or bolt 149. Two holes are disposed at the side of the reducing agent storage tank 3. The pipeline 9 and the mixed liquid conveying pipeline 4 extend outside from the two holes respectively to be connected to the compressed air generation device 13 and the ejection nozzle 2. The flange 139 may extend at the right side of the metering component 1, or may be fixed at the right side through welding or a bolt as an integral flange.

As described above, the outflow pipeline 9 and the mixed liquid conveying pipeline 4 are sealed at the shell of the metering component 1. A seal device, for example, a seal ring or seal gum, is disposed for sealing at joint M between the outflow pipeline 9 and the side of the reducing agent storage tank 3. Also, a seal device, for example, a seal ring or seal gum, is disposed for sealing at joint N between the mixed liquid conveying pipeline 4 and the side of the reducing agent storage tank 3. Definitely, according to the technology of the foregoing fixing manner, persons skilled in the art can easily fix the metering component 1 onto the bottom surface or upper surface of the reducing agent storage tank 3 through a screw or a bolt or in other common mechanical manner according to a specific structure.

It can be seen clearly from the foregoing description that, in the air-assisted reducing agent metering and ejecting system provided by the present invention, the reducing agent conveying device 111 and the metering device 112 are mounted in the sealed shell 104 or a shell formed by combining the shells 1104 and 2104, the communicating part between the pipeline 9 and the pipeline 103*a* is also located in the sealed shell 104 or is easily disposed near the shell 104, the whole shell 104 is mounted in the reducing agent storage tank 3 for storing the reducing agent, and the reducing agent storage tank 3 is generally disposed with the heating device 11. In this way, the reducing agent conveying device 111, the metering device 112, and the reducing agent unmixed with the compressed air can all be heated by the heating device 11, and the reducing agent solution (liquid) flowing through the reducing agent conveying device 111 and the metering device 112 is not condensed because of an outside low temperature, so the work of the reducing agent is not affected. The reducing agent mixed with the compressed air from the compressed air generation device 13 is driven by the compressed air to be transmitted to the ejection nozzle 2, during which the reducing agent is not condensed. In the existing air-assisted reducing agent metering and ejecting system, the reducing agent conveying device 111 and the metering device 112 are disposed on the conveying pipeline between the reducing agent storage tank 3 and the ejection nozzle. In this way, not only is the reducing agent liquid flowing through the reducing agent conveying device 111 and the metering device 112 completely exposed to the air, but also all or a vast majority of pipelines through which the liquid flowing out of the reducing agent conveying device 111 and the metering device 112 flows before being mixed with the compressed air are exposed to the air (because the reducing agent and the compressed air are mixed generally after the reducing agent is discharged from the reducing agent conveying device 111 and the metering device 112), so an additional heating device may be mounted to heat the liquid reducing agent in the pipeline.

Figure 7:
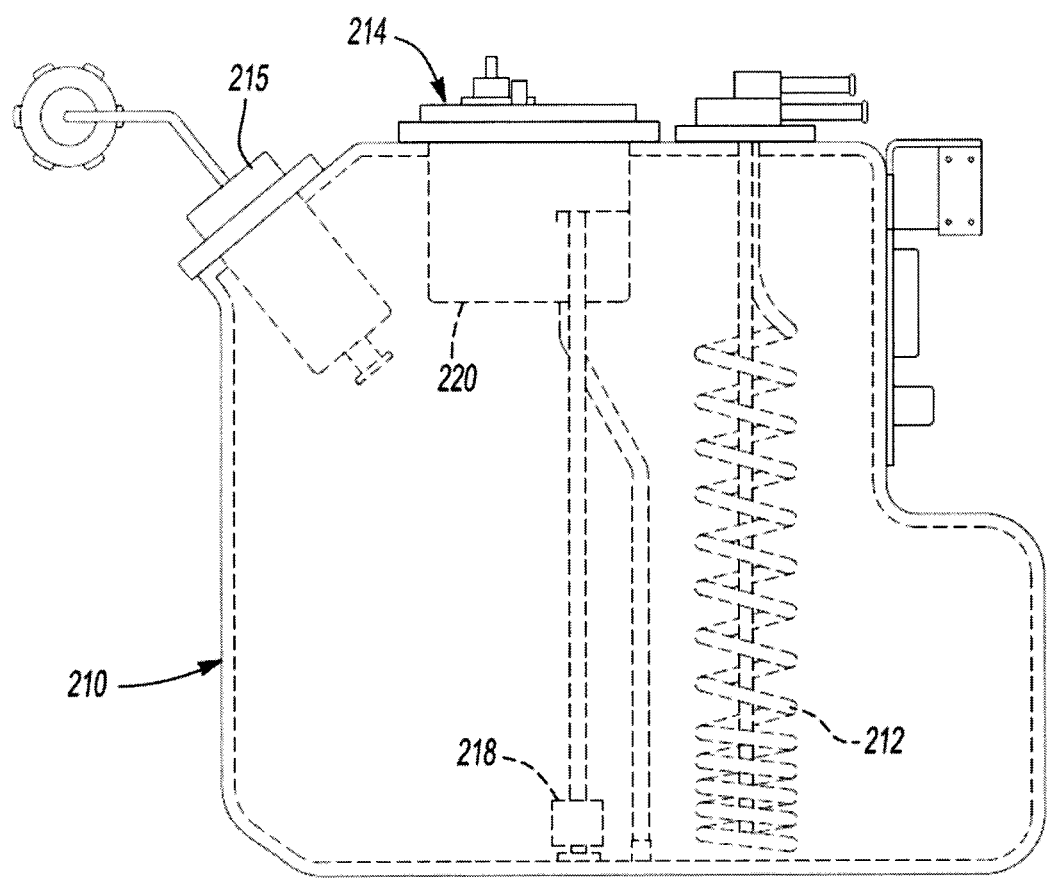
FIG. 7 is side view of another reducing agent storage tank and pump assembly according to the principles of the present disclosure.

Referring now to FIG. 7, another air-assisted reductant delivery system is provided that may include a tank 210, a heating element 212 and a pump assembly 214. The tank 210 may store a quantity of urea, for example, or any other suitable reductant and may include a fill tube 215 through which the reductant agent may be added to the tank 210. The heating element 212 may be disposed within the tank 210 and may be operable to heat the reductant within the tank 210 to maintain the temperature of the reductant above a predetermined threshold. The pump assembly 214 may be at least partially disposed within the tank 210 and may receive pressurized air from the air compressor 13 (FIG. 1) and reductant from the tank 210, as will be described in greater detail below. Like the system described above, the pump assembly 214 may be controlled by the control device 5 and may provide a mixture of air and reductant to the exhaust emissions component 10 (FIG. 1) via the mixed liquid conveying pipeline 4 and an injector 216 (FIGS. 13 and 14). One or more sensors 218 may be provided in the tank 210 to measure a level or amount of the reductant in the tank 210 and/or a temperature of the reductant, for example. The sensors 218 may communicate with the control device 5, the pump assembly 214 and/or the heating element 212.

Figure 8:
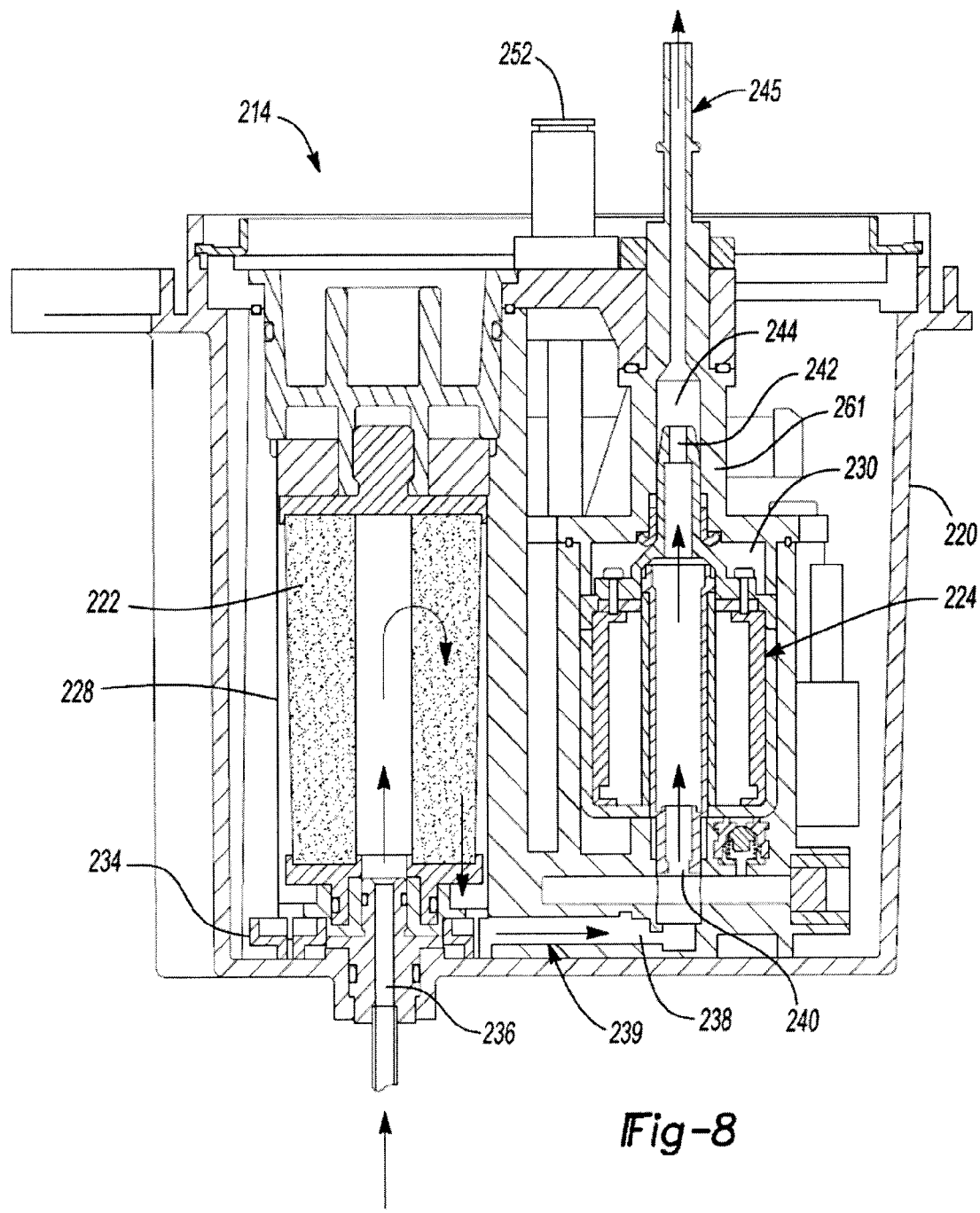
FIG. 8 is a first cross-sectional view of the pump assembly of FIG. 7.
Figure 9:
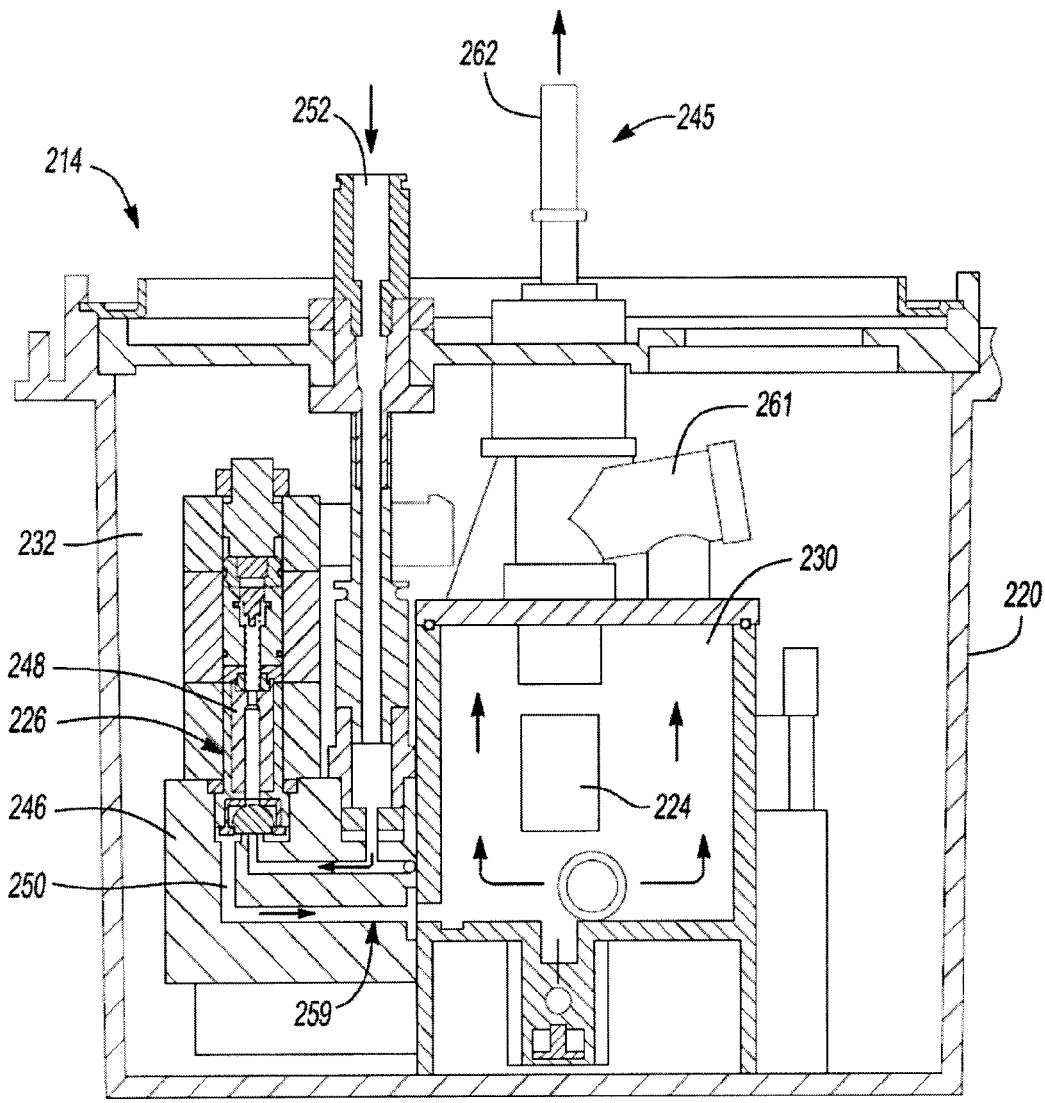
FIG. 9 is a second cross-sectional view of the pump assembly of FIG. 7.
Figure 10:
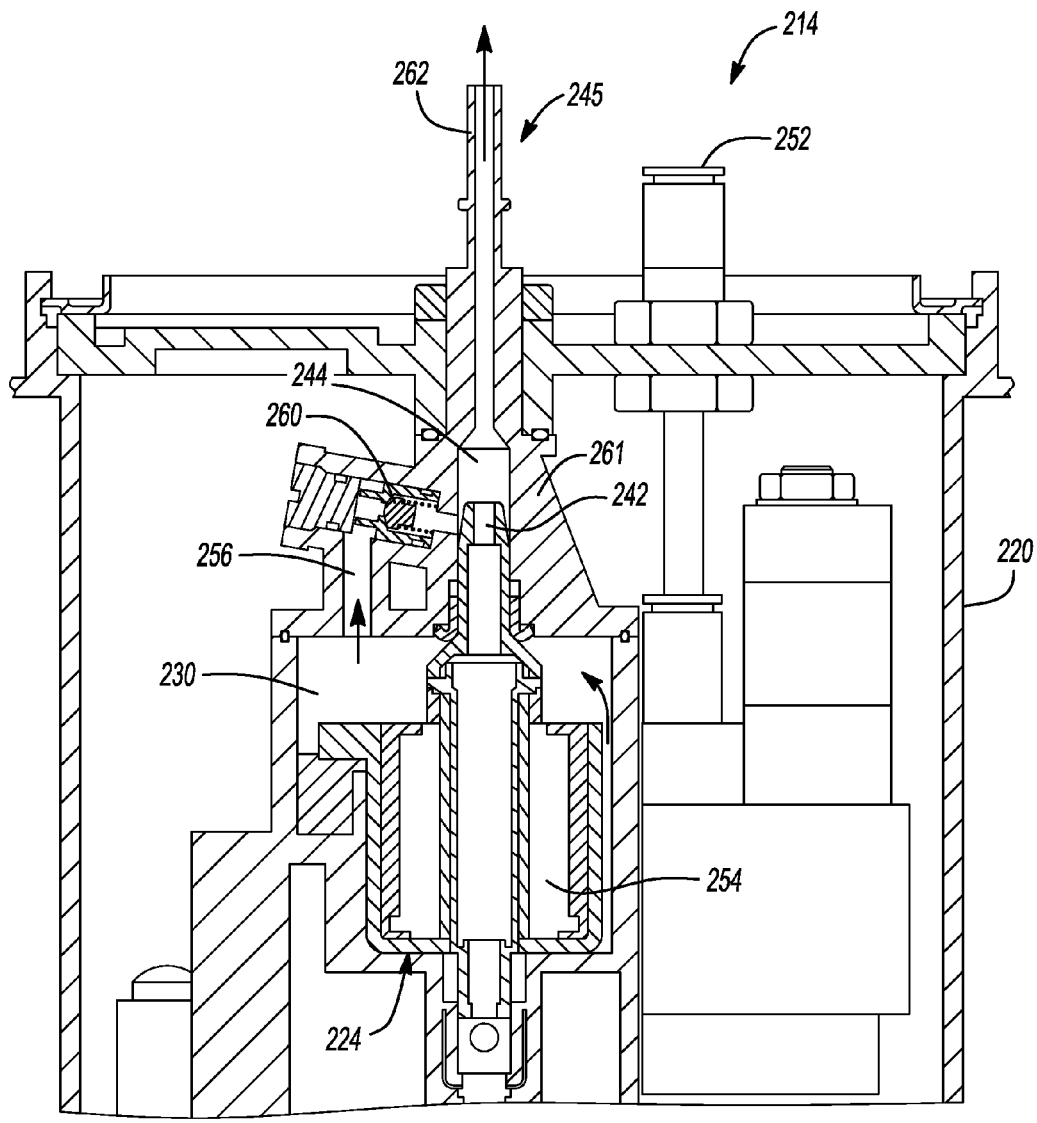
FIG. 10 is a third cross-sectional view of the pump assembly of FIG. 7.

Referring now to FIGS. 8-10, the pump assembly 214 may include a housing 220, a reductant filter 222 (FIG. 8), a pump 224, and an air valve assembly 226 (FIG. 9). The housing 220 may include a first chamber 228 housing the reductant filter 222, a second chamber 230 housing the pump 224, and a third chamber 232 housing the air valve assembly 226. In some embodiments, a reductant heater 234 (FIGS. 8 and 11) may be disposed in the housing 220 (e.g., in the first chamber 228) to heat the reductant as it flows through the pump assembly 214. The reductant heater 234 could be provided in addition to or instead of the heating element 212 described above. The reductant heater 234 could be controlled by the control device 5 (FIG. 1).

As shown in FIG. 8, reductant from the tank 210 may flow into the pump assembly 214 through a reductant inlet 236. The reductant inlet 236 may be in fluid communication with the reductant filter 222. The reductant filter 222 may be in fluid communication with the pump 224 via a conduit 238. The conduit 238 could be a passage formed in the housing 220, for example. In this manner, the pump assembly 214 may define a reductant pathway 239 comprised of the reductant inlet 236, the reductant filter 222, the conduit 238, an inlet 240 of the pump 224 and an outlet 242 of the pump 224. Operation of the pump 224 may draw reductant from the tank 210 through the reductant pathway 239 and into a mixing chamber 244 of a mixing device 245. In the mixing chamber 244, the reductant may mix with air received from the air compressor 13 and air valve assembly 226, as will be described in more detail below.

As shown in FIG. 9, the air valve assembly 226 may include a valve body 246 and a valve member 248. The valve body 246 may include an air passageway 250 that fluidly connects an air inlet 252 with the second chamber 230 housing the pump 224. The valve member 248 may control a flow of air through the valve body 246. In some embodiments, the valve member 248 may be an electromechanical valve (e.g., a solenoid valve) and may be controlled by the control device 5. In other embodiments, the valve member 248 may be a pneumatically actuated valve. It will be appreciated that the valve member 248 could be any suitable type of valve.

Air from the air compressor 13 (FIG. 1) may flow into the pump assembly 214 through the air inlet 252, as shown in FIG. 9. From the air inlet 252, the air may flow into the air passageway 250 of the valve body 246. When the valve member 248 is in an open position, air is allowed to flow through the valve body 246 and into the second chamber 230. In the second chamber 230, the air may flow around the pump 224 (as shown in FIG. 10) and/or through a motor assembly 254 of the pump 224 to cool the motor assembly 254 and/or other components of the pump 224. From the second chamber 230, the air may flow into an air inlet 256 of the mixing device 245, as shown in FIG. 10. In this manner, the pump assembly 214 may define an air flow path 259 (FIGS. 9, 10 and 12) comprised of the air inlet 252, the air valve assembly 226 (specifically, the air passageway 250), the second chamber 230 (and in some embodiments, the motor assembly 254), and the air inlet 256 of the mixing device 245. It will be appreciated that the compressor 13 could provide other types of gas (e.g., nitrogen) to the air flow path 259 in addition to or instead of air.

The mixing device 245 may include a check valve 260 that controls fluid communication between the air inlet 256 of the mixing device 245 and the mixing chamber 244. The check valve 260 may include spring-biased valve member that allows air to flow from the air inlet 256 to the mixing chamber 244, but prevents fluid flow therethrough in the opposite direction (i.e., fluid is prevented from flowing from the mixing chamber 244 to the air inlet 256). In this manner, the check valve 260 may restrict or prevent reductant in the mixing chamber 244 from flowing into the air valve assembly 226 and/or into an air supply line connecting the pump assembly 214 with the air compressor 13.

While the mixing device 245 is shown in FIG. 10 as including a body 261 integrally formed with an outlet 262, in some embodiments, the body 261 and the outlet 262 could be two separate pieces fastened together. For example, the outlet 262 could be a separate pipe that threads into the body 261 for fluid communication between the mixing chamber 244 and the outlet 262. One or more O-rings and/or other seals could be provided to prevent fluid from leaking out of the mixing device 245 at the union between the outlet 262 and the body 261. As shown in FIG. 10, a plug may engage an aperture in which the check valve 260 is disposed to retain the check valve 260 therein.

In the mixing chamber 244, air from the air inlet 256 may mix with reductant from the outlet 242 of the pump 224. The mixture of air and reductant may exit the pump assembly 214 through the outlet 262 of the mixing device 245. From the outlet 262, the mixture of air and reductant may flow through the mixed liquid conveying pipeline 4 to the injector 216. The injector 216 may atomize the reductant and inject the mixture into a stream of exhaust gas in the exhaust emissions component 10, as will be described in more detail below.

Figure 11:
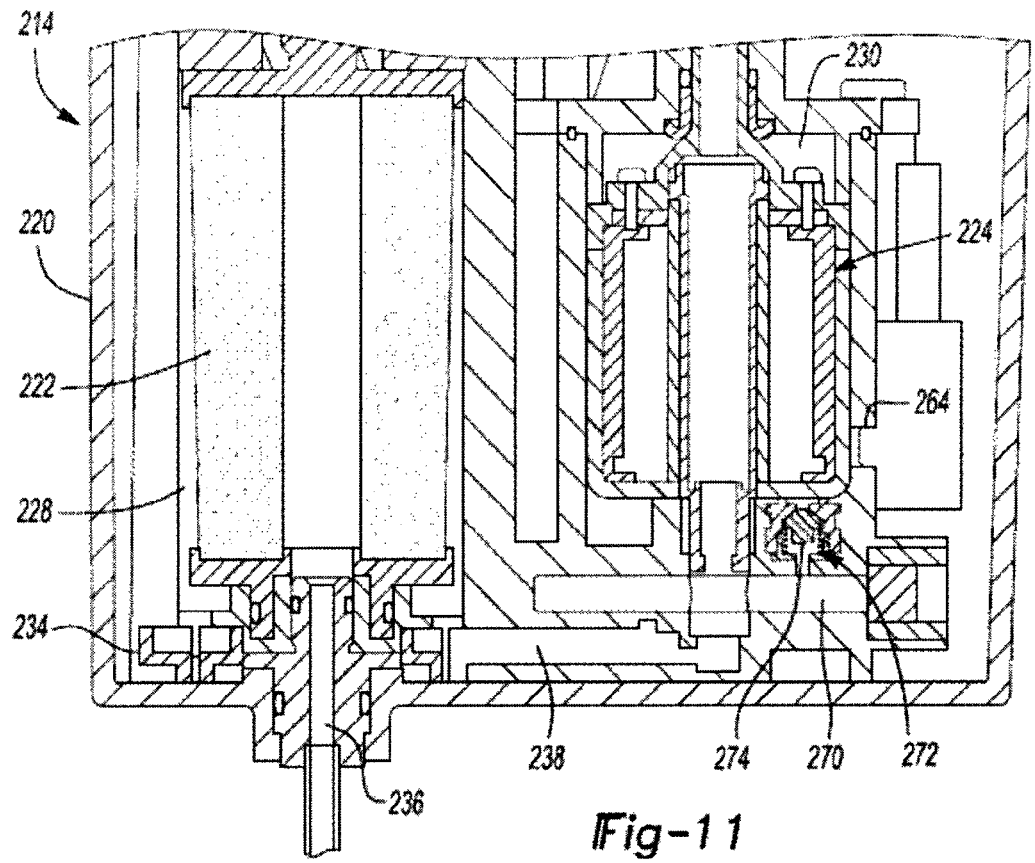
FIG. 11 is a fourth cross-sectional view of the pump assembly of FIG. 7.

As shown in FIG. 11, an air-pressure sensor 264 may be positioned to detect an air pressure within the second chamber 230. The air-pressure sensor 264 may communicate the detected air pressure to the control device 5. In some embodiments, the control device 5 may control the air compressor 13 and/or the valve member 248 of the air valve assembly 226 based, at least in part, upon the information received from the air-pressure sensor 264. While the air-pressure sensor 264 is described above as being positioned to detect air pressure in the second chamber 230, it will be appreciated that the air-pressure sensor 264 could be positioned elsewhere to detect an air pressure at another location within the pump assembly 214.

Figure 12:
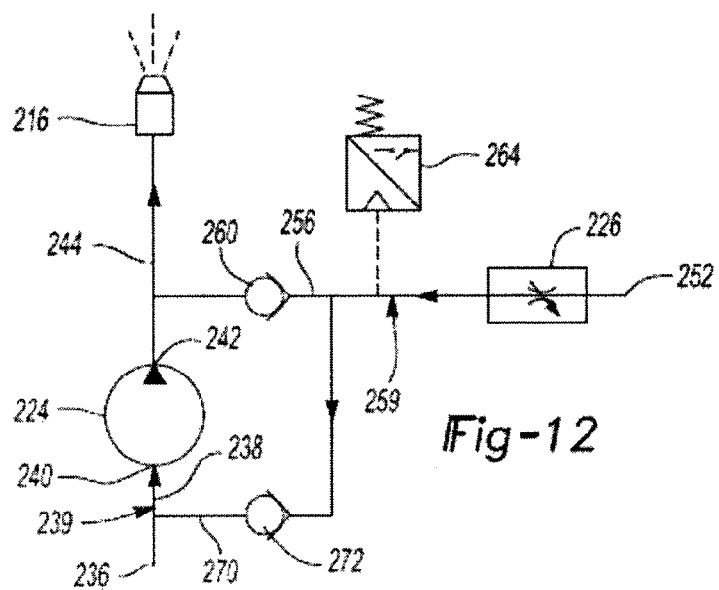
FIG. 12 is a schematic representation of the pump assembly according to the principles of the present disclosure.

As shown in FIGS. 11 and 12, the pump assembly 214 may also include a purge passageway 270 and a purge valve 272. The purge passageway 270 may be in fluid communication with one or more locations between the pump 224 and the reductant inlet 236 such as the conduit 238 and/or the reductant filter 222. The purge valve 272 may selectively allow fluid communication between the purge passageway 270 and the second chamber 230 (or elsewhere along the air flow path 259) when air pressure within the second chamber 230 is sufficiently high.

As shown in FIG. 11, the purge valve 272 may include a spring-biased valve member 274 that is normally in a closed position to prevent fluid communication between the purge passageway 270 and the second chamber 230. When air pressure within the second chamber 230 increases to a predetermined level, the spring-biased valve member 274 may be moved by the air pressure to an open position, thereby allowing air to flow from the second chamber 230 through purge valve 272 and into the purge passageway 270. From the purge passageway 270, the high-pressure air may flow through the reductant pathway 239 and may exit the pump assembly 214 through the reductant inlet 256 and/or the outlet 262 of the mixing device 245.

In some embodiments, the housing 220 may be a sealed unit. Therefore, it will be appreciated that openings in the housing 220 through which fluid conduits (e.g., the inlets 236, 252 and outlet 262) and/or electrical wires (e.g., electrical wires connected to the pump 224, air-pressure sensor 264, reductant heater 234, and air valve assembly 226) extend may be sealed with a suitable plug, potting material and/or other sealing compound, for example.

Referring now to FIGS. 13 and 14, the injector 216 may include a conduit 280, a collar 282, and a nozzle 284. The conduit 280 may be fluidly coupled to or integrally formed with the mixed liquid conveying pipeline 4, and may extend into the emissions component 10 to transmit the mixture of air and reductant to an exhaust stream in the emissions component 10. The nozzle 284 may be disposed at a first end 286 of the conduit 280. The conduit 280 may include a bend 287 proximate the distal end 286 to suitably orient the nozzle 284 relative to the exhaust stream within the emissions component 10.

The collar 282 may be attached to the conduit 280 between the bend 287 and a second end 288 of the conduit 280. The collar 282 may include a radially outwardly extending orientation tab 290. The orientation tab 290 may engage a corresponding female feature of the emissions component 10 to properly orient the conduit 280 and nozzle 284 relative to the exhaust component 10.

The nozzle 284 may include an inner member 292 and an outer cap 294. The inner member 292 may be a generally cup-shaped member and may include an inner cavity 296 (FIG. 14) and one or more apertures 298 (FIG. 13). The apertures 298 may be in fluid communication with the inner cavity 296 and may extend radially through a sidewall 300 of the inner member 292. The outer cap 294 may also be a generally cup-shaped member and may receive the inner member 292 to form a cavity 302 (FIG. 14) therebetween. As shown in FIG. 14, the cavity 302 may include a generally U-shaped cross section and may be in fluid communication with the one or more apertures 298 of the inner member 292. The cavity 302 may include an outlet 304 extending axially through an end 306 of the outer cap 294. Atomized reductant may flow out of the outlet 304 and into the exhaust stream in the emissions component 10.

With reference to FIG. 12, operation of the air-assisted reductant delivery system will be described in detail. After initial startup of the engine associated with the air-assisted reductant delivery system, the control device 5 may operate the air-assisted reductant delivery system in an air-bleed mode in which the valve member 248 of the air valve assembly 226 is moved to an open position and the air compressor 13 is operated to allow air to flow into the air flow path 259 at a first predetermined pressure (e.g., approximately 0.2-3.5 bar (absolute)). In the air-bleed mode, the pump 224 may be in a deactivated state. At the first predetermined pressure, the air may flow through the air valve assembly 226, through the check valve 260 and through the injector 216. In this manner, the flow of air through the air flow path 259 and injector 216 may prevent exhaust gas and/or other contaminants from the emissions component 10 from flowing into the air-assisted reductant delivery system and contaminating or damaging the air flow path 259 and/or the reductant pathway 239. The air flow at the first predetermined pressure may not be sufficiently strong to open the purge valve 272.

Next, the control device 5 may—in response to engine operating parameters and/or or exhaust-flow parameters, for example—operate the air-assisted reductant delivery system in a dry-prime mode. In the dry-prime mode, the control device 5 may close the valve member 248 of the air valve assembly 226 and switch on the pump 224 to pump reductant from the tank 210 through the reductant filter 222 and up to the inlet 240 of the pump 224. In this manner, air in the reductant pathway 239 may be pumped out of the reductant pathway between the tank 210 and the inlet 240 of the pump 224. When the reductant arrives at the inlet 240 of the pump 224, the control device 5 may shutdown the pump 224 and open the air valve assembly 226 to allow air at the first predetermined pressure to flow through the air flow path 259 and the mixing device 245. In some embodiments, the control device 5 may operate the air-assisted reductant delivery system in the dry-prime mode immediately after startup of the engine, in which case, the initial air-bleed mode described above may be skipped or conducted after the dry-prime mode.

Next, the control device 5 may—in response to engine operating parameters and/or or exhaust-flow parameters, for example—operate the air-assisted reductant delivery system in a dosing mode. In the dosing mode, the control device 5 may switch the pump 224 back on to force a mixture of reductant and air to flow through the injector 216 and into the exhaust stream in the emissions component 10. In some embodiments, the control device 5 may—in response to engine operating parameters and/or or exhaust-flow parameters, for example—operate the air-assisted reductant delivery system in the air-bleed mode and/or the dry-prime mode after operating the system in the dosing mode for a period of time. Switching between the dosing mode, the air-bleed mode and/or the dry-prime mode may occur one or more times during a period of continuous engine operation or a period of continuous vehicle operation.

When the engine is shutdown (or just prior to engine shutdown), the control device 5 may operate the air-assisted reductant delivery system in a primary purge mode. In the primary purge mode, the control device 5 may shutdown the pump 224 to discontinue the flow of reductant while continuing the flow of air (at the first predetermined pressure) to purge reductant from the pathway between the outlet 304 of the injector 216 and the outlet 242 of the pump 224. After the purge of reductant is complete and the engine has completely shut down, the air compressor 13 may be switched off.

If the control device 5 determines that an outside ambient temperature is sufficiently low (e.g., if the outside ambient temperature is near or below a freezing point of the reductant), the control device 5 may operate the air-assisted reductant delivery system in a secondary purge mode instead of (or in addition to) the primary purge mode described above. In the secondary purge mode, the control device 5 may shutdown the pump 224 to discontinue the flow of reductant and increase the output of the air compressor 5 to cause air to flow through the system at a second predetermined pressure (e.g., approximately 4.5-6.5 bar (absolute)) to purge reductant from the pathway between the outlet 304 of the injector 216 and the reductant inlet 236 of the housing 220 of the pump assembly 214 (i.e., purging the entire reductant pathway 239 including the pump 224 and the filter 222). A second predetermined pressure, the air flow may be sufficiently strong to open the purge valve 272 and flow through the purge passageway 270, thereby facilitating a purge of the entire pump assembly 214. After the purge of reductant is complete and the engine has completely shut down, the air compressor 13 may be switched off. The secondary purge mode may prevent reductant from freezing within the pump assembly 214 and injector 216, thereby preventing damage the pump assembly 214 and injector 216.

It will be appreciated that in some embodiments, the control device 5 could routinely operate the air-assisted reductant delivery system in the secondary purge mode instead of the primary purge mode, even if the outside ambient temperature is not near or below the freezing point of the reductant at engine shutdown. In some embodiments, the control device 5 could operate the air-assisted reductant delivery system in the secondary purge mode at any time after the engine has been shut down (e.g., when only the primary purge mode was conducted immediately before or immediately after engine shutdown), perhaps even if the engine has been shut down for a prolonged period of time (i.e., hours, days, weeks, months or years).

In some embodiments, the control device 5 may initiate the primary and/or secondary purge modes after operation in the dosing mode even if the engine has not being shut down or even if an engine shutdown event is not imminent or foreseen. For example, if outdoor ambient temperatures are sufficiently cold to freeze the reductant in the reductant flow path 239 (even during operation of the engine), the control device 5 may initiate the primary purge mode or the secondary purge mode to prevent the reductant from freezing.

In some embodiments, such as embodiments in which the engine is a part of a hybrid powertrain (i.e., a powertrain that is selectively powered by a combustion engine and an electric motor), the control device 5 may operate the system in the primary purge mode or the secondary purge mode when the entire powertrain system of the vehicle has been shut down and/or when the powertrain has been operating in an electric-motor-drive mode (i.e., a mode in which the electric motor is propelling the vehicle) for a prolonged period of time (e.g., during prolonged idling or highway cruising). In such embodiments, the control device 5 might not initiate the primary purge mode or secondary purge mode during vehicle driving conditions which will result in frequent switching between the electric-motor-drive mode and an engine-drive mode (i.e., a mode in which the engine is propelling the vehicle).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust treatment system comprising:
   a housing including a first inlet configured to receive a reductant from a tank, a second inlet configured to receive a gas from a gas compressor, and an outlet through which a mixture of the gas and the reductant exit the housing;
   a gas flow path extending between and in fluid communication with the second inlet and the outlet;
   a reductant flow path extending between and in fluid communication with the first inlet and the outlet; and
   a reductant pump at least partially disposed within the housing and including a motor in a heat transfer relationship with gas flowing through the gas flow path.

2. The exhaust treatment system of claim 1, wherein the motor is disposed within the gas flow path.

3. The exhaust treatment system of claim 1, further comprising a mixing device at least partially disposed within the housing and including a mixing chamber receiving gas from the gas flow path and reductant from the reductant flow path.

4. The exhaust treatment system of claim 3, wherein the mixing device includes a gas inlet and a valve disposed between the gas inlet and the mixing chamber.

5. The exhaust treatment system of claim 4, wherein the valve includes a check valve allowing fluid flow from the gas inlet to the mixing chamber and restricting fluid flow from the mixing chamber to the gas inlet.

6. The exhaust treatment system of claim 3, wherein the outlet of the housing includes a portion of the mixing device.

7. The exhaust treatment system of claim 1, further comprising a valve selectively restricting and allowing fluid communication between the gas flow path and the reductant flow path.

8. The exhaust treatment system of claim 7, wherein the valve opens to allow fluid communication between the gas flow path and the reductant flow path in response to gas within the gas flow path reaching a predetermined pressure threshold.

9. The exhaust treatment system of claim 1, further comprising a heating element disposed within the housing and in a heat transfer relationship with reductant downstream of the first inlet.

10. The exhaust treatment system of claim 1, wherein the gas includes air.

11. An exhaust treatment system comprising:
    a housing including a first inlet configured to receive a reductant from a tank, a second inlet configured to receive a gas from a gas compressor, and an outlet through which the gas and the reductant exit the housing;
    a gas flow path extending between and in fluid communication with the second inlet and the outlet;
    a reductant flow path extending between and in fluid communication with the first inlet and the outlet;
    a pump at least partially disposed within the housing and including a motor in a heat transfer relationship with gas flowing through the gas flow path; and
    an injector receiving a mixture of the gas and reductant and injecting the mixture into an exhaust stream, the injector including a distal end having an inner member and an outer cap surrounding the inner member to form a cavity therebetween.

12. The exhaust treatment system of claim 11, wherein the inner member includes a radially extending aperture in fluid communication with the cavity.

13. The exhaust treatment system of claim 12, wherein the outer cap includes an axially extending aperture in fluid communication with the cavity.

14. An exhaust treatment system comprising:
    a housing including a first inlet configured to receive a reductant from a tank, a second inlet configured to receive a gas from a gas compressor, and an outlet through which the gas and the reductant exit the housing;
    a gas flow path extending between and in fluid communication with the second inlet and the outlet;
    a reductant flow path extending between and in fluid communication with the first inlet and the outlet; and
    a mixing device at least partially disposed within the housing and including a mixing chamber receiving gas from the gas flow path and reductant from the reductant flow path, the mixing device including a gas inlet and a valve disposed between the gas inlet and the mixing chamber, the valve allowing fluid flow from the gas inlet to the mixing chamber and restricting fluid flow from the mixing chamber to the gas inlet.

15. The exhaust treatment system of claim 14, further comprising a reductant pump at least partially disposed within the housing and including a motor disposed along the gas flow path and in a heat transfer relationship with gas flowing through the gas flow path.

16. The exhaust treatment system of claim 14, wherein the outlet of the housing includes a portion of the mixing device.

17. The exhaust treatment system of claim 14, further comprising a purge valve selectively restricting and allowing fluid communication between the gas flow path and the reductant flow path.

18. The exhaust treatment system of claim 17, wherein the purge valve selectively restricts and allows fluid communication between the gas flow path and a location of the reductant flow path that is between a reductant pump and the tank.

19. The exhaust treatment system of claim 17, wherein the purge valve opens to allow fluid communication between the gas flow path and the reductant flow path in response to gas within the gas flow path reaching a predetermined pressure threshold.

20. The exhaust treatment system of claim 14, further comprising a heating element disposed within the housing and in a heat transfer relationship with reductant downstream of the first inlet.

21. The exhaust treatment system of claim 14, wherein the gas includes air.

22. The exhaust treatment system of claim 14, further comprising an injector receiving a mixture of the gas and reductant and injecting the mixture into an exhaust stream, the injector including a distal end having an inner member and an outer cap surrounding the inner member to form a cavity therebetween.

23. The exhaust treatment system of claim 22, wherein the inner member includes a radially extending aperture in fluid communication with the cavity.

24. The exhaust treatment system of claim 23, wherein the outer cap includes an axially extending aperture in fluid communication with the cavity.

25. An exhaust treatment system comprising:
a gas flow path including a valve;
a reductant flow path including a pump operable to draw reductant from a storage container through the reductant flow path, wherein the pump is positioned such that a gas flowing through the gas flow path flows around the pump to cool the pump;
a nozzle receiving the gas downstream of the valve and receiving reductant from the pump; and
a purge line including a first portion fluidly connected to the gas flow path upstream of the valve, and a second portion fluidly connected to the reductant flow path upstream of the pump, the purge line including a purge valve selectively allowing gas from the gas flow path to flow into the purge line and into the reductant flow path.

26. The exhaust treatment system of claim 25, wherein the purge valve opens in response to a pressure within the gas flow path reaching a predetermined threshold to allow the gas to flow into the reductant flow path.

27. The exhaust treatment system of claim 26, wherein the purge valve is a spring-biased check valve.

28. The exhaust treatment system of claim 25, wherein the reductant flow path includes an inlet through which reductant enters the reductant flow path when the purge valve is closed, and wherein fluid flows out of the inlet when the purge valve is open.

29. The exhaust treatment system of claim 25, wherein gas in the gas flow path and reductant in the reductant flow path are fluidly isolated from each other when the purge valve is in a closed position.

30. The exhaust treatment system of claim 25, further comprising a mixing device receiving gas from the gas flow path and reductant from the reductant flow path, wherein the valve allows fluid flow from the gas flow path to the mixing chamber and restricts fluid flow from the mixing chamber to the gas flow path.

31. The exhaust treatment system of claim 25, wherein the gas includes air.

32. The exhaust treatment system of claim 25, wherein the nozzle receives a mixture of the gas and reductant and injects the mixture into an exhaust stream, the nozzle including an inner member and an outer cap surrounding the inner member to form a cavity therebetween, the inner member including a radially extending aperture in fluid communication with the cavity, the outer cap including an axially extending aperture in fluid communication with the cavity.

33. The exhaust treatment system of claim 25, wherein the pump includes a motor in a heat transfer relationship with gas flowing through the gas flow path.

34. A method of operating a reductant delivery system including a reductant flow path, an air flow path, and a nozzle in selective fluid communication with the reductant flow path and the air flow path, the method comprising:
operating the system in a first mode in which reductant is prevented from flowing through the nozzle and air is allowed to flow through the air flow path and the nozzle;
operating the system in a second mode in which a supply of air is restricted from the air flow path and reductant is allowed to at least partially fill the reductant flow path;
operating the system in a third mode in which air is allowed to flow through the air flow path and the nozzle and reductant is simultaneously allowed to flow through the reductant flow path and the nozzle; and
operating the system in a fourth mode in which air is allowed to flow through the air flow path and the nozzle and purge reductant from the pathway between the reductant flow path and the nozzle and purge reductant from a portion of the reductant flow path upstream of a reductant pump.

35. The method of claim 34, wherein air is supplied to the air flow path at a first predetermined pressure in the fourth mode and at least one of the first and third modes.

36. The method of claim 34, wherein operating the system in the fourth mode includes purging reductant from the entire reductant flow path.

37. The method of claim 36, wherein air is supplied to the air flow path at a first predetermined pressure in at least one of the first and third modes and air is supplied to the air flow path at a second predetermined pressure in the fourth mode.

38. The method of claim 36, wherein operating the system in the fourth mode includes opening a purge valve to provide fluid communication between the air flow path and the reductant flow path.

39. The method of claim 34, wherein operating the system in the third mode includes mixing air from the air flow path with reductant from the reductant flow path in a mixing chamber disposed upstream of the nozzle.

40. The method of claim 34, wherein the system is operated in the second mode after operating the system in the first mode.

41. The method of claim 40, wherein the system is operated in the third mode after operating the system in the second mode.

42. The method of claim 41, wherein the system is operated in the fourth mode after operating the system in the third mode.

* * * * *